United States Patent
Bergman et al.

(10) Patent No.: US 10,105,908 B2
(45) Date of Patent: Oct. 23, 2018

(54) PROCESS FOR PRODUCING MODIFIED OLEFIN POLYMER IN AN EXTRUDER

(71) Applicant: Borealis AG, Vienna (AT)

(72) Inventors: Nicke Bergman, Nösund (SE); Udo Muster, Salzburg (AT); Norbert Reichelt, Neuhofen/Krems (AT); Wolfgang Gierlinger, Linz (AT)

(73) Assignee: Borealis AG, Vienna (AT)

(*) Notice: Subject to any disclaimer, the term of this patent is extended or adjusted under 35 U.S.C. 154(b) by 0 days.

(21) Appl. No.: 15/544,204

(22) PCT Filed: Feb. 3, 2016

(86) PCT No.: PCT/EP2016/052219
§ 371 (c)(1),
(2) Date: Jul. 17, 2017

(87) PCT Pub. No.: WO2016/124617
PCT Pub. Date: Aug. 11, 2016

(65) Prior Publication Data
US 2017/0361543 A1    Dec. 21, 2017

(30) Foreign Application Priority Data

Feb. 4, 2015  (EP) ..................................... 15153729
Dec. 18, 2015 (EP) ..................................... 15201094

(51) Int. Cl.
B29C 47/10    (2006.01)
B29C 67/24    (2006.01)
(Continued)

(52) U.S. Cl.
CPC .............. *B29C 67/246* (2013.01); *B29B 9/06* (2013.01); *C08F 255/02* (2013.01); *C08J 3/24* (2013.01);
(Continued)

(58) Field of Classification Search
None
See application file for complete search history.

(56) References Cited

U.S. PATENT DOCUMENTS 3,553,176 A * 1/1971 Fujisaki et al. ........... C08F 8/00
525/248
3,632,670 A * 1/1972 Fujisaki et al. ....... C08F 255/00
525/193

(Continued)

FOREIGN PATENT DOCUMENTS

EP    792894    9/1997
EP    879830    11/1998
(Continued)

OTHER PUBLICATIONS

International Search Report and Written Opinion for PCT/EP2016/052219 dated Apr. 8, 2016.
(Continued)

Primary Examiner — Edmund H Lee
(74) Attorney, Agent, or Firm — Lowenstein Sandler LLP

(57) ABSTRACT

The present invention is directed to a process for producing a modified olefin polymer in an extruder having a feed zone, a melting zone, optionally a mixing zone and optionally a die zone, (A) introducing a stream of an olefin polymer into the feed zone of the extruder; (B) introducing a stream of a free radical generator directly into the feed zone or the melting zone or the mixing zone, if present, of the extruder; (C) introducing a stream of a functionally unsaturated compound directly into the feed zone or the melting zone or the mixing zone, if present, of the extruder; (D) extruding the mixture in the extruder at a temperature which is greater than the decomposition temperature of the free radical generator and the melting temperature of the olefin polymer but less than the decomposition temperature of the olefin polymer thereby producing the modified olefin polymer in the
(Continued)

extruder; and, optionally, (G) passing the melt of the modified olefin polymer through the die zone to a pelletiser.

17 Claims, 4 Drawing Sheets

(51) Int. Cl.
*C08F 255/02* (2006.01)
*B29B 9/06* (2006.01)
*C08J 3/24* (2006.01)
*B29C 47/30* (2006.01)
*B29C 47/76* (2006.01)
*B29C 47/92* (2006.01)
*B29K 23/00* (2006.01)

(52) U.S. Cl.
CPC ............ *B29C 47/30* (2013.01); *B29C 47/762* (2013.01); *B29C 47/92* (2013.01); *B29K 2023/12* (2013.01); *C08J 2323/12* (2013.01); *C08J 2323/14* (2013.01)

(56) References Cited

U.S. PATENT DOCUMENTS

| | | | | |
|---|---|---|---|---|
| 4,032,592 | A | * | 6/1977 | Ogihara ................ C08F 255/02 525/263 |
| 6,077,907 | A | | 6/2000 | Raetzsch et al. |
| 6,204,348 | B1 | | 3/2001 | Raetzsch et al. |
| 6,433,109 | B1 | * | 8/2002 | Raetzsch ............... C08F 255/02 526/335 |

FOREIGN PATENT DOCUMENTS

| | | |
|---|---|---|
| EP | 1174261 | 1/2001 |
| EP | 1354901 | 10/2003 |
| EP | 2679630 | 1/2014 |
| EP | 2810961 | 12/2014 |
| JP | H09278917 | 10/1997 |
| WO | WO9927007 | 6/1999 |
| WO | WO0052065 | 2/2000 |
| WO | WO0075228 | 12/2000 |
| WO | WO2004113399 | 12/2001 |
| WO | 2014001394 | 1/2014 |
| WO | WO2014016205 | 1/2014 |
| WO | WO2014016206 | 1/2014 |

OTHER PUBLICATIONS

International Preliminary Report on Patentability for PCT/EP2016/052219 dated Mar. 27, 2017.

Office Action for Korean Patent Application No. 10-2017-7022598 with Enlglish Translation dated Feb. 6, 2018, 13 pages.

Wagner, "Rheotens-Mastercurves and Drawability of Polymer Melts", Polymer Engineering and Science, vol. 36, Apr. 1996, pp. 925 to 935.

Jackson, et al., "Molecular Weight Sensitive Detectors for Size Exclusion Chromatography" in: Handbook of Size Exclusion Chromatography and related techniques, C.-S. Wu, 2nd ed., Marcel Dekker, New York, 2004, p. 103.

Rauwendaal, "Polymer Extrusion", Carl Hanser Verlag, Munich 1986, pp. 402-414; 233-256; 257-274; 395-402.

Saunders, et al., Macromolecules, 2005, 38, 6418-6422.

* cited by examiner

PROCESS FOR PRODUCING MODIFIED OLEFIN POLYMER IN AN EXTRUDER

FIELD OF THE INVENTION

The present invention is directed to a process for producing modified olefin polymer having increased melt strength in an extrusion process. The invention further relates to a propylene product obtainable by the process according to the invention. Especially, the present invention is directed to a process for producing a modified olefin polymer having high melt strength (HMS), high melt extensibility and low gel content (XHU) directly by reactive extrusion processing. In particular, the present invention is directed to an economical process for producing modified olefin polymer where the process has low investment and operating costs while still produces excellent and consistent product quality, especially related to the material properties like high melt strength, melt extensibility and gel content.

High melt strength polypropylenes (HMS-PP) are generally known in the art. However, the known processes involve several unit operations (multistage processes) for gaining polypropylene with high melt strength, high melt extensibility and low gel content.

EP-A-792894 discloses a multistage process where both thermal decomposable free-radical forming agents, such as peroxide, and an unsaturated monomer were fed in gaseous state downstream of the polymerisation reactor and subsequently were sorbed into solid polyolefin particles. Subsequently the reactive powder mixture containing the thermal decomposable peroxide and the functional monomer was passed to a reaction stage, for instance, in an extruder. The desired decomposition of the thermal free radical generators can be supported by the application of an additional high frequency (HF-) and/or micro-wave (MW-) field beside the thermal heating device.

EP-A-1174261 discloses a process where modified polypropylene was produced by mixing solid polypropylene powder, peroxycarbonate and butadiene were mixed in a continuously operating mixer for an average residence time of about 10 minutes after which the reactive powder mixture was transferred into an extruder.

WO-A-99/27007 relates to a process for enhancing the melt strength of polypropylene in a two stage-process by (1) mixing the solid polypropylene particles at least with one solid organic based peroxycarbonate and furthermore without an additional coupling agent, and (2) heating up the reactive powder mixture at temperatures between 150 and 300° C., for instance in an extruder. The peroxycarbonate should be present by more than 50%, preferably 80% at temperatures of 120° C., preferably 150° C.

U.S. Pat. No. 6,077,907 discloses a process where polypropylene was mixed with a peroxide and diene or divinylbenzene in a mixer where the residence time was about 4 minutes. The powder soaked with peroxide and bifunctional monomer was passed to an extruder for producing modified polypropylene.

U.S. Pat. No. 6,204,348 and the corresponding EP-A-879830 disclose in FIG. 1 a process having a continuous pre-mixer for mixing polypropylene powder, a free radical generator and a multifunctional monomer before their introduction into a feed port of an extruder. The thus formed mixture was subjected to modification reactions at temperatures higher than the melting temperature of polypropylene in the extruder for finally achieving long chain branched polypropylene.

JP-A-09278917 discloses a process where a mixture of polypropylene, 1,3 butadiene and a free radical generator was extruded in a twin screw extruder for producing polypropylene foam. The document did not disclose how the components were introduced into the extruder.

One problem with the above-described prior art processes is that they require the presence of a pre-mixing or pre-soaking step for soaking the peroxide and the bifunctional monomer. This results in complicated equipment and increases the investment cost.

Another problem associated with the prior art processes is that a part of the functionally unsaturated compound is lost in the process. At increased temperature the functionally unsaturated compound is evaporated from the polymer particles in the melting zone of the extruder and lost by backwards flow through the feed hopper. Thereby efficiency becomes low.

Thus, there remains a need in the art for a more simplified method with fewer process stages for producing high melt strength polypropylene (HMS-PP) of consistent and/or improved quality compared to the quality properties of HMS-PP achieved by the process in EP-A-0879830 and other prior art documents.

The above mentioned disadvantages have now been overcome by providing a process for producing a modified olefin polymer in an extruder having a feed zone, a melting zone, optionally a mixing zone and optionally a die zone, (A) introducing a stream of an olefin polymer into the feed zone of the extruder;

(B) introducing a stream of a free radical generator directly into the feed zone or the melting zone or the mixing zone, if present, of the extruder;

(C) introducing a stream of a functionally unsaturated compound directly into the feed zone or the melting zone or the mixing zone, if present, of the extruder;

(D) extruding the mixture in the extruder at a temperature which is greater than the decomposition temperature of the free radical generator and the melting temperature of the olefin polymer but less than the decomposition temperature of the olefin polymer thereby producing the modified olefin polymer in the extruder and, optionally, (G) passing the melt of the modified olefin polymer through the die zone to a pelletiser.

In one variant the invention is directed to a process for producing a modified olefin polymer in an extruder having a feed zone, a melting zone, a mixing zone and a die zone, the process comprising the steps of: (A) introducing a stream of the olefin polymer into the feed zone of the extruder; (B) introducing a stream of a free radical generator directly into the feed zone or the melting zone of the extruder; (C) introducing a stream of a functionally unsaturated compound directly into the feed zone or the melting zone of the extruder; (D) extruding the mixture in the extruder at a temperature which is greater than the decomposition temperature of the free radical generator and the melting temperature of the olefin polymer but less than the decomposition temperature of the olefin polymer thereby producing the modified olefin polymer in the extruder; and (G) passing the melt of the modified olefin polymer through the die zone to a pelletiser.

In another variant the invention is directed to a process for producing a modified olefin polymer wherein a first extrusion process is carried out in an extruder having a feed zone, a melting zone, a mixing zone and optionally a die zone, the first extrusion process comprising the steps of: (A) introducing a stream of an olefin polymer into the feed zone of the extruder; (B) introducing a stream of a free radical generator directly into the melting zone or the mixing zone of the extruder; (C) introducing a stream of a functionally unsaturated compound directly into the melting zone or the mixing zone of the extruder; (D) extruding the mixture in the extruder at a temperature which is greater than the decomposition temperature of the free radical generator and the melting temperature of the olefin polymer but less than the decomposition temperature of the olefin polymer thereby producing the modified olefin polymer in the extruder, optionally comprising the steps of: (E) transferring the melt of the modified olefin polymer to a second extrusion process, the second extrusion process being carried out in a extruder having a devolatilization zone and a die zone, wherein such second extrusion process comprises the steps of: (F) extruding the melt of the modified olefin polymer through the devolatilization zone thereby withdrawing volatile components from the polymer melt; and (G) passing the melt of the modified olefin polymer through the die zone to a pelletiser.

Unless otherwise explicitly stated to the contrary, in the following preferred features of the process according to the present invention including all variants thereof are described.

The process for producing a modified olefin polymer according to the invention has lower investment and operating costs than the prior art processes. Another advantage is that the emission of chemicals e.g., gaseous components, to the environment is reduced by such a process.

FIG. 1 shows a prior art process according to U.S. Pat. No. 6,204,348 for producing modified polyolefins.

OLEFIN POLYMER

Figure 1:
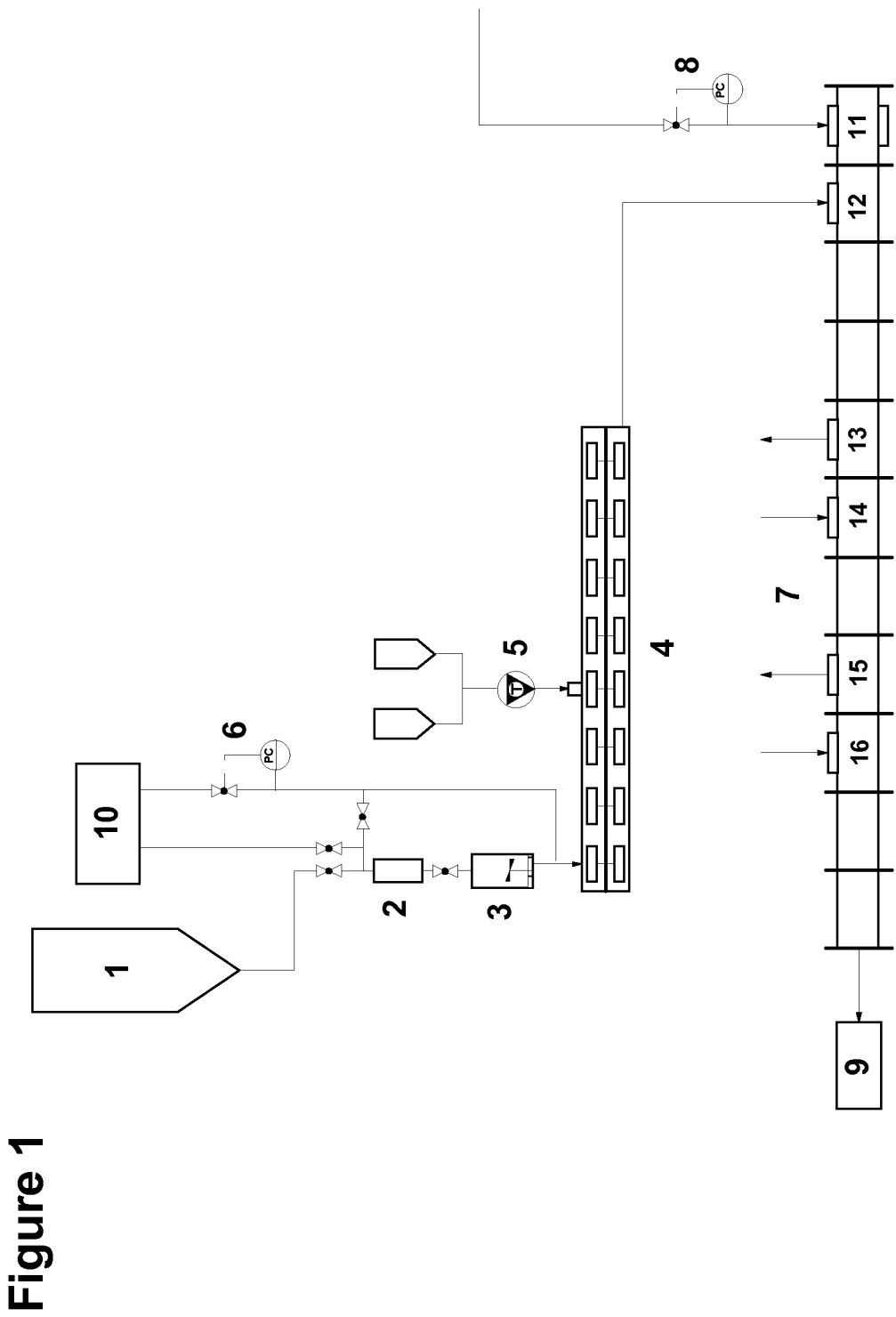

According to the present invention the olefin polymer which is used as raw material in the process of the present invention may be any homopolymer or copolymer of an alpha-olefin having from 2 to 10 carbon atoms and mixtures thereof. Preferably, the olefin polymer is selected from the group consisting of: homopolymers of ethylene and copolymers of ethylene with one or more alpha olefins having from 3 to 10 carbon atoms; homopolymers of propylene and copolymers of propylene with one or more comonomers selected from ethylene and alpha-olefins having from 4 to 10 carbon atoms; homopolymers of 1-butene and copolymers of 1-butene with one or more comonomers selected from ethylene, propylene and alpha-olefins having from 6 to 10 carbon atoms; and homopolymers of 4-methyl-1-pentene and copolymers of 4-methyl-1-pentene with one or more comonomers selected from ethylene, propylene, 1-butene, 1-hexene and alpha-olefins having from 8 to 10 carbon atoms; and mixtures thereof. Especially preferably the olefin polymer is a homopolymer of propylene or a copolymer of propylene with one or more comonomers selected from ethylene and alpha-olefins having from 4 to 10 carbon atoms or a mixture thereof. The olefin polymer which is used as a raw material in the process of the present invention is preferably an essentially linear polymer. By "essentially linear" is meant that the olefin polymer may contain short chain branches having a length of up to 8 carbon atoms, preferably up to 6 carbon atoms, such as from 1 to 4 carbon atoms. However, the long chain branches are preferably substantially absent from the raw material. The presence of long chain branches can be detected according to the methods known in the art, such as by using rheology, by analysing the content of long chain branches by measuring the long chain branching parameter g' by GPC. For instance, the value of g' of at least 0.96, such as at least 0.97 or at least 0.98 is an indication that long chain branches are not present. On the other hand, a value of g' of not more than 0.9 indicates that the polymer contains long chain branches.

The melt flow rate of the olefin polymer may be selected in relatively broad ranges. When the olefin polymer is a homopolymer of propylene or a copolymer of propylene the melt flow rate MFR2 is preferably from 0.1 to 50 g/10 min, more preferably from 0.5 to 40 g/10 min. The melt flow rate MFR2 is measured according to ISO 1133 under a load of 2.16 kg and at a temperature of 230° C. for polypropylene.

As mentioned above, the olefin polymer may be a homopolymer or a copolymer. If the olefin polymer is a copolymer then it generally contains from 0.1 to 10.0% by mole of comonomer(s). For example, if the olefin polymer is a copolymer of propylene then it generally contains from 90.0 to 99.9% by mole, preferably from 92.0 to 99.5% by mole, of units derived from propylene and generally from 0.1 to 10.0% by mole, preferably 0.5 to 8.0% by mole, of units derived from the comonomer(s).

The olefin polymer may also be a heterophasic copolymer, such as heterophasic copolymer of propylene, where an amorphous phase composed of an elastomeric copolymer is dispersed into a matrix phase formed by a semicrystalline olefin homopolymer or copolymer, such as semicrystalline propylene homopolymer or copolymer.

The olefin polymer may be in the form of particles or pellets. Preferably the olefin polymer is in the form of particles. The particles are typically formed in a polymerisation process, such as slurry polymerisation process or gas phase polymerisation process where the olefin is polymerised in the presence of an olefin polymerisation catalyst. After the particles have been recovered from the polymerisation reactor they are subjected to pressure reduction and purging steps to remove the residual hydrocarbons from the polymer.

The particle characteristics of the olefin polymer are not critical. This is in contrast to prior art processes where the free radical generator and the functionally unsaturated compound were pre-mixed and soaked into the olefin polymer and where the polymer needed to have well-defined particle characteristics to ensure consistent product quality. However, even though the particle characteristics are not critical it is anyway desired that the particle size of the polymer is not excessively large to ensure proper melting in the extruder and the bulk density of the powder is suitably high for ensuring acceptable throughput. The median particle diameter is suitably from 50 to 2000 µm, and preferably from 100 to 1500 µm. Furthermore, it is preferred that the bulk density of the powder is at least 300 kg/m$^3$, more preferably at least 350 kg/m$^3$ and in particular at least 400 kg/m$^3$. By particle diameter is here normally meant the volume surface diameter, unless otherwise stated.

Free Radical Generator

The free radical generator is a compound which is capable of producing free radicals. Typically the free radical generator decomposes and the decomposition products are free radicals.

Generally peroxides are used as free radical generators. Preferably the free radical generator is selected from the group comprising acyl peroxide, alkyl peroxide, hydroperoxide, perester, peroxycarbonate and mixtures thereof. The following listed peroxides are particularly preferred:

acyl peroxides (ACPER): benzoyl peroxide, 4-chlorobenzoyl peroxide, 3-methoxybenzoyl peroxide and/or methyl benzoyl peroxide. alkyl peroxides (ALPER): allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide. peresters and peroxy carbonates (PER): butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Also contemplated are mixtures of these above listed free radical generators. So for example the following combinations are possible:
i) ACPER and ALPER
ii) ACPER and PER
iii) ALPER and PER
iv) ACPER and ALPER and PER The person skilled in the art knows how to choose the appropriate free radical generator that will produce free radicals during the process for producing a modified olefin polymer according to the present invention.

In the process for producing a modified olefin polymer according to the invention, the olefin polymer is generally mixed with 0.05 to 3.00% by weight of the free radical generator based on the weight of the olefin polymer, preferably mixed with 0.10 to 1.5% by weight of the free radical generator based on the weight of the olefin polymer, more preferably mixed with 0.1 to 1.0% by weight of free radical generator based on the weight of the olefin polymer. In a preferred way of working the olefin polymer is mixed with 0.05 to 1.50% by weight of acyl peroxide, alkyl peroxide, hydro peroxide, perester and/or peroxycarbonate based on the weight of the olefin polymer, preferably with 0.05 to 1.50% by weight of acyl peroxide, alkyl peroxide, perester and/or peroxycarbonate based on the weight of the olefin polymer. Especially preferably, the free radical generator has a half-life time at 160° C. of not more than 60 seconds, like from 1 to 60 s. In particular, the free radical generator has half-life time at 160° C. of from 10 to 50 s, and especially from 20 to 45 s.

The amount of the free radical generator is calculated based on the total amount of the dry olefin polymer.

Functionally Unsaturated Compound

The functionally unsaturated compound can be a bifunctionally or multifunctionally unsaturated compound chosen from:
a bifunctionally unsaturated monomer, oligomer and/or polymer or
a multifunctionally unsaturated monomer, oligomer and/or polymer or
a mixture of (a) and (b).

"Bifunctionally unsaturated or multifunctionally unsaturated" as used above means the presence of respectively two or more non-aromatic double bonds.

Generally, only those bifunctionally or multifunctionally unsaturated compounds are used which can be oligomerized or polymerized with the aid of free radicals.

Generally the bifunctionally unsaturated monomers are chosen from:
divinyl compounds, such as for example divinylaniline, m-divinylbenzene, p-divinylbenzene, divinylpentane and divinylpropane;
allyl compounds, such as for example allyl acrylate, allyl methacrylate, allyl methyl maleate and allyl vinyl ether;
dienes, such as for example 1,3-butadiene, chloroprene, cyclohexadiene, cyclopentadiene, 2,3-dimethylbutadiene, heptadiene, hexadiene, isoprene and 1,4-pentadiene;
aromatic and/or aliphatic bis (maleimide) bis (citraconimide);
and mixtures of any of these unsaturated monomers.

Preferably the bifunctionally unsaturated monomers are 1,3-butadiene, isoprene, dimethyl butadiene and divinylbenzene.

The bifunctionally unsaturated polymers are generally polymers comprising at least one of the above mentioned bifunctionally unsaturated monomers. The multifunctionally unsaturated polymer contains more than one unsaturated monomer as described above. Examples of such polymers including oligomers are:
polybutadienes, especially where the different microstructures in the polymer chain, i.e. 1,4-cis, 1,4-trans and 1,2-(vinyl) are predominantly in the 1,2-(vinyl) configuration, copolymers of butadiene and styrene having the 1,2-(vinyl) configuration in the polymer chain.

A preferred polymer is polybutadiene, in particular a polybutadiene having more than 50.0 wt % of the butadiene in the 1,2-(vinyl) configuration. The 1,2-(vinyl) configuration is determined by 1H and 13C NMR spectroscopy.

In the process for producing a modified olefin polymer according to the invention, a functionally unsaturated compound is optionally used. Usually not more than three different functionally unsaturated compounds are used; preferably one functionally unsaturated compound is used in the process for producing a modified olefin polymer according to the invention.

The term "functionally unsaturated compound" denotes the functionally unsaturated compounds that have been previously defined. Generally the functionally unsaturated compound is used in a concentration of 0.05 to 2.5% by weight of the functionally unsaturated compound based on the weight of the olefin polymer, preferably in a concentration of 0.05 to 1.5% by weight of the functionally unsaturated compound based on the weight of the olefin polymer, more preferably in a concentration of 0.1 to 1.0% by weight of the functionally unsaturated compound based on the weight of the olefin polymer. The amount of the functionally unsaturated compound is calculated based on the total amount of the dry olefin polymer.

Extruder

The process according to the present invention is carried out in an extruder.

The streams of the olefin polymer, the free radical generator and the functionally unsaturated compound are suitably passed to the extruder. The extruder may be any extruder known in the art. The extruder may thus be a single screw extruder; a twin screw extruder, such as a co-rotating twin screw extruder or a counter-rotating twin screw extruder; or a multi-screw extruder, such as a ring extruder. Especially preferably extruder is a co-rotating twin screw extruder. Such extruders are well known in the art and are supplied, for instance, by Coperion, Japan Steel Works, Krauss Maffei Berstorff or Leisteritz.

The extruder typically comprises a feed zone, a melting zone, a mixing zone and, optionally, a die zone. In case comprising a die, the melt pressed through the die is typically solidified and cut to pellets in a pelletiser.

The extruder typically has a length over diameter ratio, L/D, of from about 6:1 to about 65:1, preferably from about 8:1 to 60:1. As it is well known in the art the co-rotating twin screw extruders usually have a greater L/D than the counter-rotating twin screw extruders.

The extruder may have one or more evacuation, or vent, ports for removing gaseous components from the extruder. Such gaseous components may include unreacted functionally unsaturated compound, unreacted free radical generator or decomposition products thereof. Such evacuation port should be placed in a sufficient downstream location for allowing sufficient reaction time for the free radical generator and the functionally unsaturated compound with the olefin polymer. Suitably the evacuation port can be located within the downstream end of the melting zone or within the mixing zone.

A stripping agent, such as water, steam, carbon dioxide or nitrogen, is suitably added to the extruder to assist in removing the volatile components, such as unreacted functionally unsaturated compound, from the polymer melt. Such stripping agent, when used, is added upstream of the evacuation port or upstream of the most downstream evacuation port, if there are multiple evacuation ports.

The extruder may also have one or more feed ports for feeding further components, such as polymer, additives and the like, into the extruder. The location of such additional feed ports depends on the type of material added through the port.

Feed Zone

The olefin polymer is introduced into the extruder through a feed zone. The feed zone directs the olefin polymer into the melting zone. Typically the feed zone is formed of a feed hopper and a connection pipe connecting the hopper into the melting zone. Usually the olefin polymer flows through the feed zone under the action of gravity, i.e., generally downwards. The residence time of the olefin polymer (and other components) in the feed zone is typically short, normally not more than 30 seconds, more often not more than 20 seconds, such as not more than 10 seconds. Typically the residence time is at least 0.1 seconds, such as one second.

The streams of either one of the free radical generator, the functionally unsaturated monomer, or both can be introduced directly into the feed zone of the extruder. By "directly" is here meant that the components enter the feed zone as fresh reactants and do not pass via a prior reaction or mixing zone. Therein they would have been mixed with the olefin polymer. Thereby the contact time between the free radical generator or the functionally unsaturated monomer or the combination of those and the olefin polymer is not more than 30 seconds, or not more than 20 seconds or not more than 10 seconds if the stream of the free radical generator or the functionally unsaturated monomer or the combination of those is passed to the feed zone of the extruder.

Melting Zone

The polymer passes from the feed zone to a melting zone. In the melting zone the particulate olefin polymer melts. The solid polymer particles are conveyed by drag caused by the rotating screw. The temperature then increases along the length of the screw through dissipation of frictional heat and increases to a level above the melting temperature of the polymer. Thereby the solid particles start to melt.

It is preferred that the screw in the melting zone is designed so that the screw in the melting zone is completely filled. Thereby the solid particles form a compact bed in the melting zone. This happens when there is sufficient pressure generation in the screw channel and the screw channel is fully filled. Typically the screw in the melting zone comprises conveying elements without substantial backwards flow. However, in order to achieve compact bed some barrier or back-mixing elements may need to be installed at a suitable location, for instance, close to the downstream end of the melting zone. The screw design for obtaining a compact particle bed is well known in the extruder industry. The problem is discussed, among others, in paragraphs 7.2.2 and 8.6.2 of Chris Rauwendaal: "Polymer Extrusion", Carl Hanser Verlag, Munich 1986.

Due to frictional heat the temperature increases along the length of the screw and the polymer starts to melt. The melting behavior is discussed, for instance, in the above-mentioned book of Chris Rauwendaal, in the paragraph 7.3, especially in 7.3.1.1, and 7.3.2.

In a specially preferred embodiment at least one of the streams of the free radical generator and the functionally unsaturated monomer is introduced into the melting zone. Suitably the stream is introduced into the melting zone by spraying the stream in liquid form into the melting zone. Spraying nozzles may suitably be used in spraying the free radical generator or the functionally unsaturated monomer into the melting zone. It is especially preferred that both of the streams of the free radical generator and the functionally unsaturated monomer are introduced into the melting zone. The streams may then be combined into one stream or they can be fed as separate streams. If they are fed as separate streams it is then preferred that the stream of the functionally unsaturated monomer enters the extruder downstream of the stream of the free radical generator.

When there is a compact bed of solid polymer particles formed in the melting zone upstream of the injection point of the free radical generator or, preferably, the functionally unsaturated monomer then the free radical generator or the functionally unsaturated monomer cannot escape from the extruder through the feed port.

Especially the functionally unsaturated monomer may be evaporated at the high temperature in the extruder. However, the compact bed which has been formed upstream the injection point of the functionally unsaturated monomer prevents the vaporised monomer from reaching the feed port and escaping from there.

When the stream of the free radical generator or the functionally unsaturated monomer or the combination of those is passed directly to the melting zone of the extruder (i.e., not passing through the feed zone) then the reactant is introduced directly to environment where it should react. The morphology (such as particle size or particle density) of the polymer particles makes no difference on how the reactants reach the polymer. Thus, the process is not sensitive to differences in the raw material properties and different types of polymers can be used.

Mixing Zone

After the melting zone the polymer passes to a mixing zone. The screw in the mixing zone typically comprises one or more mixing sections which comprise screw elements providing a certain degree of backward flow. In the mixing zone the polymer melt is mixed for achieving a homogeneous mixture. The mixing zone may also comprise additional elements, such as a throttle valve or a gear pump. The extruder manufacturers usually can provide designs of mixing zones suitable for different types of polymers (like polypropylene, polyethylene and so on). Such designs are generally applicable in the process of the present invention.

It is also possible to introduce one or both of the streams of the free radical generator and the functionally unsaturated monomer into the mixing zone. The feed may be arranged in the same way as discussed above for the melting zone.

The temperature in the mixing zone is greater than the melting temperature of the olefin polymer. Further, the temperature needs to be greater than the decomposition temperature of the free radical generator. The temperature needs to be less than the decomposition temperature of the olefin polymer. Suitably, the temperature is from about 5° C. greater than the melting temperature of the olefin polymer, preferably from about 10° C. greater than the melting temperature of the olefin polymer to preferably about 300° C., more preferably about 280° C. and especially preferably to about 240° C. For instance, for some propylene homopolymers the temperature should be preferably at least 165° C., more preferably at least 170° C.

The decomposition of the free radical generator starts in the melting zone, if the free radical generator is present in the melting zone, and continues in the mixing zone. The thus formed free radicals react with the polymer chains and especially tertiary carbon atoms and double bonds therein, thus creating polymer radicals. These polymer radicals may react with the double bonds of the functionally unsaturated compound, thus creating polymer chains with double bonds. These double bonds in the polymer chain may further react with other polymeric radicals thus forming long-chain branched polymer.

The overall average residence time in the combined melting zone and the mixing zone of the extruder should be preferably at least about 25 seconds and more preferably at least about 30 seconds. Typically the average residence time does not exceed 60 seconds and preferably it does not exceed 55 seconds. Good results have been obtained when the average residence time was within the range of from 30 to 45 seconds.

As it was discussed above, it is preferred to remove gaseous material from the extruder via one or more evacuation ports or, as they are sometimes called, vent ports. The gaseous material is typically unreacted functionally unsaturated compound or degradation products of the free radical generator. Venting of gaseous material from the extruder is well known in the industry and is discussed, for instance, in the above-mentioned book of Chris Rauwendaal, in paragraphs 8.5.2 and 8.5.3.

It is possible to use more than one evacuation port. For instance, there may be two ports, an upstream port for crude degassing and a downstream port for removing the remaining volatile material. Such an arrangement is advantageous if there is large amount of gaseous material in the extruder.

The vent ports are suitably located in the mixing zone. However, they may also be located at the downstream end of the melting zone. Especially if there are multiple vent ports it is sometimes advantageous to have the most upstream port within the melting zone and the subsequent port(s) in the mixing zone.

Preferably the vent ports are connected to a reduced pressure, such as from atmospheric pressure to a pressure of 0.5 bar less than atmospheric pressure, more preferably from a pressure of 0.05 bar less than atmospheric pressure to a pressure of 0.4 bar less than atmospheric pressure, It is also possible to add a stripping agent, such as water, steam, $CO_2$ or $N_2$, into the extruder. Such stripping agent, when used, is introduced upstream of the vent port or, when there are multiple vent ports, upstream of the most downstream vent port and downstream of the upstream vent port. Typically the stripping agent is introduced into the mixing zone or at the downstream end of the melting zone. Stripping is discussed, among others, in paragraph 8.5.2.4 of the book of Chris Rauwendaal.

Die Zone

The die zone typically comprises a die plate, which is sometimes also called breaker plate and which is a thick metal disk having multiple holes. The holes are parallel to the screw axis. The molten olefin polymer is pressed through the die plate. The molten polymer thus forms a multitude of strands. The strands are then passed to the pelletiser.

The function of the die plate is to arrest the spiraling motion of the polymer melt and force it to flow in one direction.

The die zone may also comprise one or more screens which are typically supported by the die plate. The screens are used for removing foreign material from the polymer melt and also for removing gels from the polymer. The gels are typically undispersed high molecular weight polymer, for instance, cross-linked polymer.

Multi-step Extrusion

It is also possible to conduct the extrusion process of the present invention as a multi-step extrusion, preferably a two-step extrusion, in two, optionally more than two, cascaded extruders. In such configuration the upstream extruder as defined above includes the feed zone, the melting zone and preferably also the mixing zone. The downstream extruder may include the mixing zone, and usually including one or more evacuation ports.

In the present invention "upstream extruder" and "first extruder" are used synonymously. Likewise "downstream extruder" and "second extruder" are used synonymously.

As the second extruder usually has the purpose of devolatilising the polymer, the evacuation ports are present.

The second extruder may further comprise feed ports for feeding the additives to the melt.

The extruder may be a single screw extruder; a twin screw extruder, such as a co rotating twin screw extruder or a counter-rotating twin screw extruder; or a multi screw extruder, such as a ring extruder. Especially preferably extruder is a single screw extruder. Such extruders are well known in the art and are supplied, for instance, by Coperion, Japan Steel Works, Krauss Maffei Berstorff or Leisteritz. The extruder of the second extrusion process typically comprises a devolatilization zone and a die zone. In the devolatilisation zone the volatile compounds are removed from the melt as described above through one or more evacuation ports.

The extruder of the second extrusion process typically has a length over diameter ratio, L/D, of from about 6:1 to about 65:1, preferably from about 8:1 to 60:1 or from about 6:1 to 20:1. As it is well known in the art the co-rotating twin screw extruders usually have a greater L/D than the counter rotating twin screw extruders.

The devolatilization zone comprised in the extruder of the second extrusion process generally comprises one or more evacuation, or vent, ports for removing gaseous components from the melt of the modified olefin polymer. Such gaseous components may include unreacted functionally unsaturated compound, unreacted free radical generator or decomposition products thereof.

Preferably the evacuation ports are connected to a reduced pressure, such as from atmospheric pressure to a pressure of 0.5 bar less than atmospheric pressure, more preferably from a pressure of 0.05 bar less than atmospheric pressure to a pressure of 0.4 bar less than atmospheric pressure, A stripping agent, such as water, steam or nitrogen, is suitably added to the extruder of the second extrusion process to assist in removing the gaseous components. Such stripping agent, when used, is added upstream of the evacuation port or upstream of the most downstream evacuation port, if there are multiple evacuation ports.

The extruder of the second extrusion process may also have one or more feed ports for feeding further components, such as polymer, additives and the like, into such extruder. The location of such additional feed ports depends on the type of material added through the feed port.

Generally the residence time of the melt of the modified olefin polymer in the devolatilization zone of the second extrusion process is at least 15 seconds such as >15 seconds.

Pelletiser

The strands of molten polymer are passed through the die plate into the pelletiser. Usually, the pelletiser comprises a water bath and a set of rotating knives adjacent to the die plate. The strands are cooled and solidified in the water and the rotating knives cut the strands to pellets. The size of the pellets can be adjusted by selecting a suitable number of knives and selecting a suitable rotation speed.

The water temperature in the pelletiser is typically from 20 to 90° C., and preferably from 30 to 70° C. A stream of water, into which the pellets are suspended, is withdrawn from the pelletiser. The pellets are separated from the water stream after which they are dried and recovered. The water stream is passed to a cooling step and returned into the pelletiser. Optionally, fresh water is added to the water stream for compensating losses.

Modified Olefin Polymer

The modified olefin polymer is characterised by having long chain branches. They are formed by the reactions between the olefin polymer, the free radical generator and the functionally unsaturated compound as described above.

Preferably the modified olefin polymer has $F_{30}$ melt strength, measured according to ISO 16790:2005 at a die pressure of 30 bar, of at least 3.4 cN, more preferably from 4.0 to 50.0 cN, such as from 10.0 to 40.0 cN.

A suitable lower limit is 3.4 cN, preferably 4.0 cN, more preferably 10.0 cN. A suitable upper limit is 50.0 cN, preferably 40.0 cN. The lower and upper indicated values of the $F_{30}$ melt strength ranges are included.

The polypropylene product obtainable by the process for producing a modified olefin polymer according to the invention generally has a v30 melt extensibility, measured according to ISO 16790:2005 at a die pressure of 30 bar, of at least 170 mm/s, preferably of at least 200 mm/s, more preferably in the range of 240 to 300 mm/s. Further, the modified olefin polymer preferably has g' of not more than 0.95, more preferably not more than 0.90, even more preferably not more than 0.80, such as not more than 0.75 or 0.70. Generally g' is at least 0.5, such as at least 0.6.

The modified olefin polymers produced by the process of the present invention have increased melt strength, enhanced melt extensibility and low gel content.

The polypropylene product obtainable by the process for producing a modified olefin polymer according to the invention generally has an amount of residual decomposition products, as measured according to VDA 277, of less than 200 µg/g, preferably of less than 150 µg/g, more preferably of less than 100 µg/g.

The modified olefin polymers are well known in the art, for instance from EP-A-792894, EP-A-1174261, WO-A-99/27007, U.S. Pat. Nos. 6,077,907, 6,204,348 and JP-A-09278917.

FIGURES

FIG. 1 discloses a prior art process which is used for producing the modified polyolefins. The reference numbers in this FIG. 1 have the following meanings.
1 Intermediate storage bin for olefin polymer
2 Product transfer tube
3 Metering device for solids
4 Continuous heatable flow-through mixer
5 Dosing pump for radical generating agent
6 Gas pressure control
7 Twin screw extruder
8 Quantity control for monomer metering
9 Granulating equipment (pelletiser)
10 Waste gas purification
11 Special housing with connecting piece for supplying the gas
12 Special housing with connection piece for supplying the powdery reaction mixture into the extruder (feed hopper)
13 Special housing with connecting piece for degassing (evacuation or vent port)
14 Special housing with connecting piece for metering-in the entraining agent
15 Special housing with connecting piece for final degassing (evacuation or vent port)
16 Special housing with connecting piece for metering additional material The olefin polymer passes from the intermediate storage bin (1) over a product transfer tube (2) and a solids metering device (3) to a continuous, heatable flow-through mixer (4), which has a high homogenizing effect during the mixing of the polypropylene particles with the optionally added thermally decomposing free radical generator.

The free radical generator is transported with the metering pump (5) to an apparatus for atomizing the liquid and sprayed onto the fluidized bed produced by mechanically mixing the polymer powder in the flow-through mixer (4), in which the bifunctional, unsaturated monomers in the gas phase are absorbed by the olefin polymer particles.

The gas mixture containing the functionally unsaturated compound is metered over a quantity controller (6), the set point of which is fixed as a function of a mass pressure or the melt index. The gaseous functionally unsaturated compound is passed into a special housing (11) of the twin screw extruder (7), upstream of the feed hopper (12) for the powdery reaction mixture, and flows counter-currently to the powder through the feed hopper (12) into the continuously heatable through-flow mixer (4). In the addition pipe (2) and the metering device (3) of the flow-through mixer (4), the functionally unsaturated compound mixes with inert gas or oxygen or inert gas/oxygen mixtures carried in with the powder. The gas mixture flows over a pressure control (6) to the waste gas purification system (10).

The gas mixture containing the functionally unsaturated compound can optionally be circulated by a compressor circulating pump.

The twin screw extruder (7), which is fitted at the special housing (11) with a connecting piece for supplying gas, makes it possible to heat and melt the modified olefin polymer, supplied over the connecting piece (12), between the connecting pieces (12) and (13) in the presence of the functionally unsaturated compound. The connecting piece (13) serves for removing most of the gases from the modified olefin polymer. The twin screw extruder is equipped with a connecting piece for metering-in the entraining agent (14). Downstream of the connecting piece (14) there is a second connecting piece (15) for degassing where the remaining unreacted functionally unsaturated compound is withdrawn from the extruder (7). Optionally, further auxiliary materials, such as additives, can be added over the feed port (16). The downstream granulating equipment (9) brings about the comminution of the melt extrudate.

Figure 2:
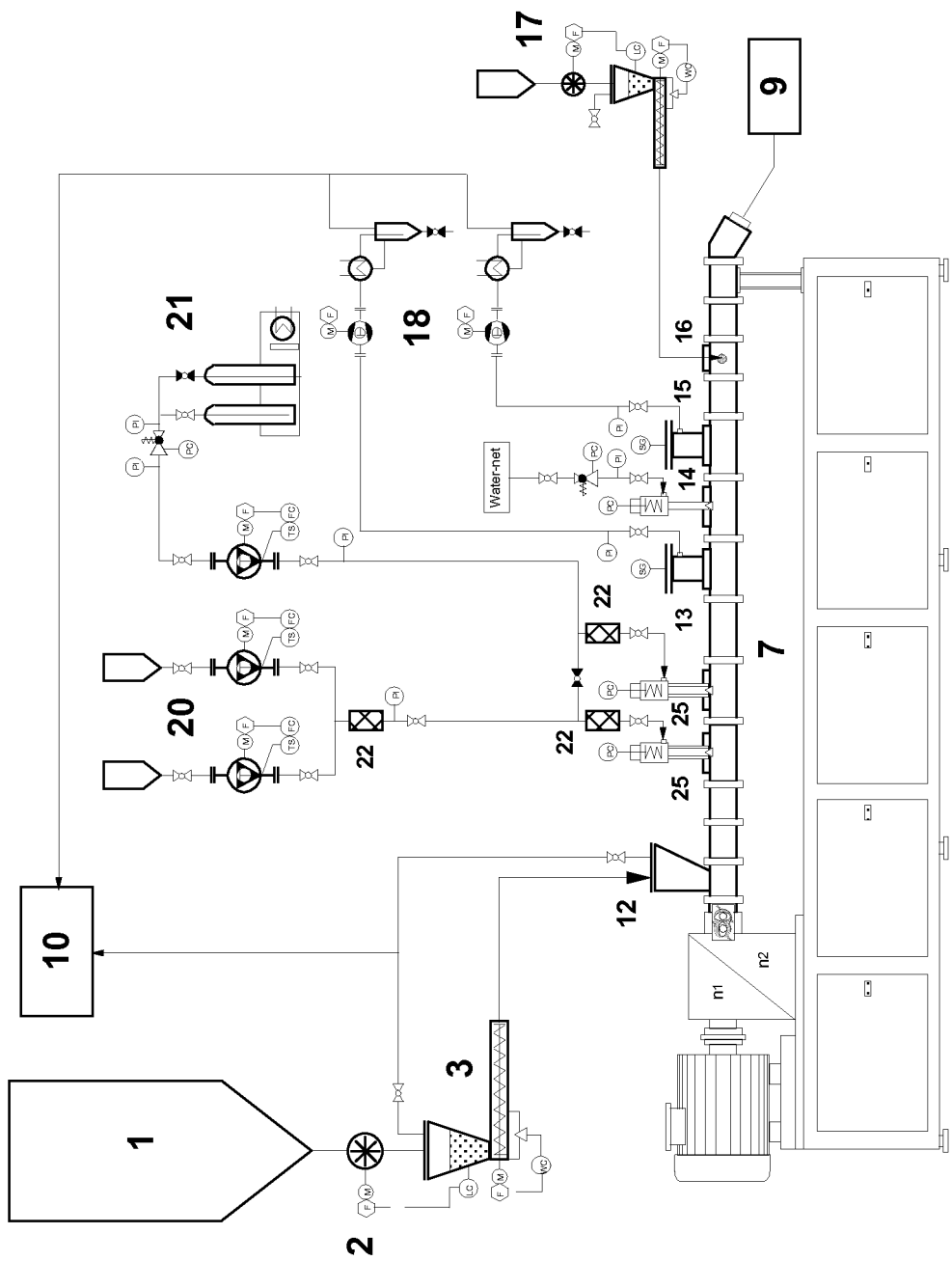
FIG. 2 shows a process exemplifying the present invention.

FIG. 2 shows one embodiment according to the present invention.

12 Special housing for supplying the olefin polymer into extruder (feed hopper)
13 Special casing for 1st-degassing (evacuation port or vent port)
14 Special device for controlled dosing of stripping agent, e.g. special designed spray nozzle
15 Special casing for 2nd-fine degassing (evacuation port or vent port)
16 Dosing of polymer additives, e.g. by side stream screw conveyer
17 Polymer additive bin incl. weight flow measure and control equipment
18 Evaporator equipment for gaseous monomer and decomposition products
20 Dosing pumps for radical generating agent incl. diluting agents
21 Conditioning equipment for liquid/gaseous monomer
22 Static mixing elements for liquid/gas or liquid/liquid mixing
25 Special device for controlled dosing of either radical forming agents or liquid/gaseous monomer or a liquid mixture of both, e.g. special designed water-cooled spray nozzle In the process according to the present invention the olefin polymer passes from the intermediate storage bin (1) over a product transfer tube (2) and a solids metering device (3) which feeds the olefin polymer powder directly to the feed hopper (12) of the extruder (7). The product transfer tube (2) may additionally include a rotary valve as shown in FIG. 2. The metering device (3) is suitably a loss-of-weight feeder.

The olefin polymer powder is passed from the metering device to the feed hopper (12) of the extruder (7). The polymer melt is extruded through a die plate into a pelletiser (9) where it is cut to pellets.

The solution comprising the free radical generator is transferred from the feed vessels by using the dosing pumps (20). The solution is passed through a static mixer (22) and optionally combined with the functionally unsaturated compound. The functionally unsaturated compound comes from the feed vessels equipped with a conditioning unit for keeping the functionally unsaturated compound in desired conditions. The combined feed comprising the functionally unsaturated compound and the free radical generator is passed through a static mixer (22). The stream is then passed through the melting zone of the extruder (7) via a spray nozzle (25). Alternatively, the streams of the free radical generator and the functionally unsaturated compound may be passed separately to the melting zone of the extruder (7) via two separate spray nozzles (25).

Additives in particulate form, such as antioxidants, acid scavengers, nucleating agents, split agents, pigments and the like, may be added into the extruder (7) through the feed port (16) from an additive bin using suitable equipment for mass flow measurement and control (17).

Gaseous materials, such as unreacted functionally unsaturated compound, are vented from the extruder (7) via one or more evacuation ports (13) and (15). The upstream evacuation port (13) serves the purpose for removing the major amount of the gaseous material. The downstream evacuation port (15) is then used for removing the remaining unreacted functionally unsaturated compound. The thus recovered gaseous materials are passed through one or more evaporators (18), thus eliminating the presence of liquids in the withdrawal line. It is also possible to feed an entraining agent, such as steam or nitrogen, via port (14) to assist in removing all gaseous by-products from the extruder via evacuation ports (13) and (15). Furthermore, excess gas is withdrawn from the powder feeder (3) and the feed hopper (12). The gases are directed to waste gas purification (10).

Figure 3:
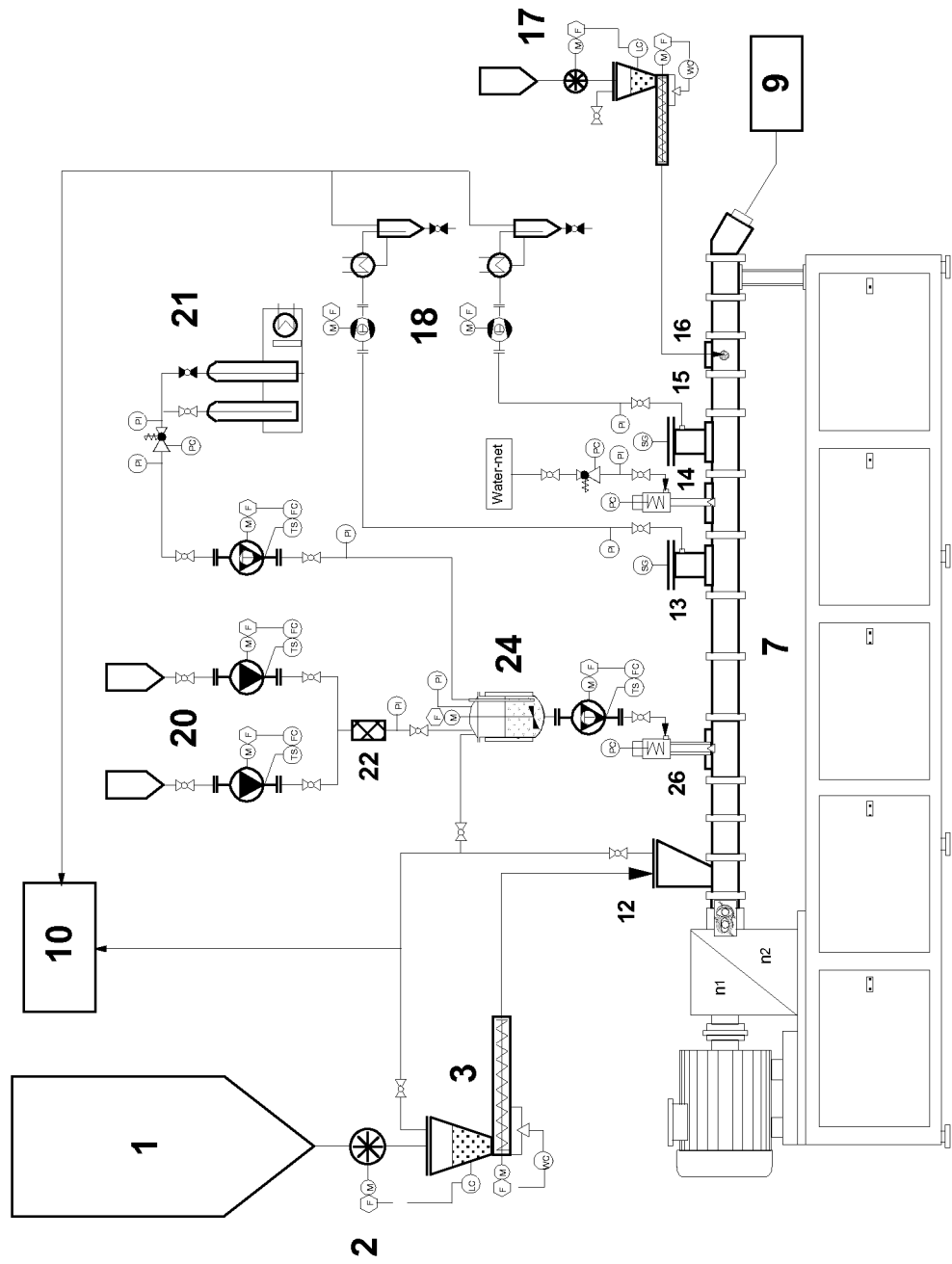
FIG. 3 shows an alternative embodiment exemplifying the present invention.
Figure 4:
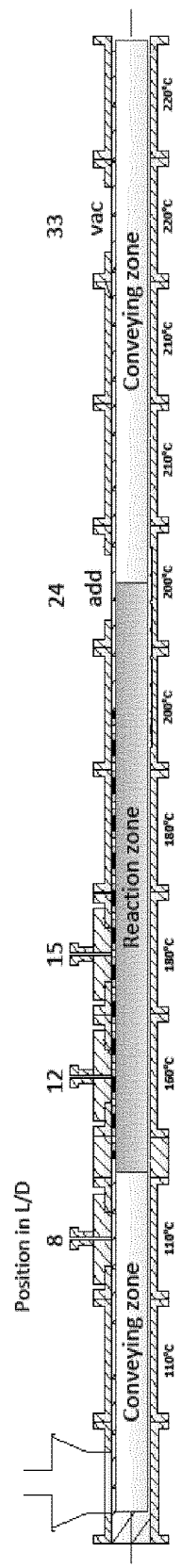
FIG. 4 is a schematic drawing, showing the locations of the feed ports, of the extruder used in the examples.

The embodiment of FIG. 3 is otherwise similar to that of FIG. 2 but the free radical generator and the functionally unsaturated compound are mixed together before they are passed into the extruder (7). To facilitate the mixing both streams are passed to a gas-liquid or liquid-liquid absorber (24). The absorber (24) is equipped with a metering device, such as dosing pump, which transfers the mixture comprising the free radical generator and the functionally unsaturated compound to the spray nozzle (26) via which the mixture is passed into the melting zone of the extruder (7). FIG. 4 is a schematic drawing, showing the locations of the feed ports, of the extruder used in the examples.

The Process

The process according to the present invention for producing a modified olefin polymer in an extruder having a feed zone, a melting zone, optionally a mixing zone and optionally a die zone, (A) introducing a stream of an olefin polymer into the feed zone of the extruder;
(B) introducing a stream of a free radical generator directly into the feed zone or the melting zone or the mixing zone, if present, of the extruder;
(C) introducing a stream of a functionally unsaturated compound directly into the feed zone or the melting zone or the mixing zone, if present, of the extruder;

(D) extruding the mixture in the extruder at a temperature which is greater than the decomposition temperature of the free radical generator and the melting temperature of the olefin polymer but less than the decomposition temperature of the olefin polymer thereby producing the modified olefin polymer in the extruder and, optionally, (G) passing the melt of the modified olefin polymer through the die zone to a pelletiser.

Generally the stream of olefin polymer is introduced into the feed zone in the form of particles or pellets.

The streams of the free radical generator and the functionally unsaturated compound may be introduced into the first or only extrusion process in different zones of the extruder. Such zones where the free radical generator and the functionally unsaturated compound may be introduced into the first or only extrusion process are called dosing ports. The temperature in such dosing ports is generally between 20 and 180° C. to prevent undesired decomposition of radical source and potential oliomerization polymerization reactions that might lead to plugging of dosing equipment.

The streams of either one of the free radical generator, the functionally unsaturated monomer, or both can be introduced directly into the melting zone and/or into the mixing zone of the extruder comprised in the first or only extrusion process. By "directly" is here meant that the components enter the melting zone and/or the mixing zone as fresh reactants and do not pass via a prior reaction or mixing process. Therein they would have been mixed with the olefin polymer.

Generally at least one of the streams of the free radical generator and the functionally unsaturated compound is introduced into the melting zone or into the mixing zone of the extruder comprised in the first or only extrusion process. Preferably, the stream of the functionally unsaturated compound is introduced into the melting zone of the extruder comprised in the first or only extrusion process. More preferably, both of the streams of the free radical generator and the functionally unsaturated compound are introduced into the melting zone of the extruder comprised in the first or only extrusion process.

Generally the stream of free radical generator and/or the functionally unsaturated compound is introduced into the first or only extrusion process by spraying the streams in liquid form into the extruder. Spraying nozzles may suitably be used in spraying the free radical generator or the functionally unsaturated compound into the first or only extrusion process. The streams may be combined into one stream or they can be fed as separate streams. If they are fed as separate streams it is then preferred that the stream of the functionally unsaturated compound enters the extruder downstream of the stream of the free radical generator.

When both of the streams of the free radical generator and the functionally unsaturated compound are introduced into the melting zone or the mixing zone of the extruder comprised in the first or only extrusion process (i.e., not passing through the feed zone) then the free radical generator and the functionally unsaturated compound are introduced directly to the environment where it should react. The morphology (such as particle size or particle density) of the olefin polymer particles makes no difference on how the free radical generator and the functionally unsaturated compound or the combination reaches the olefin polymer. Thus, the process is not sensitive to differences in the raw material properties and different types of olefin polymers can be used.

When the free radical generator is introduced into the extruder comprised in the first or only extrusion process, the decomposition of such radical generator starts and forms free radicals. Thus the formed free radicals generally react with the olefin polymer chains and especially with the tertiary carbon atoms and double bonds therein, creating olefin polymer radicals. These olefin polymer radicals may react with the double bonds of the functionally unsaturated compound, thus creating olefin polymer chains with double bonds. These double bonds in the olefin polymer chain may further react with other polymeric radicals thus forming a molten olefin polymer comprising mainly functionally unsaturated compounds grafted to the olefin polymer chains.

The extrusion temperature in the melting zone of the extruder comprised in the first or only extrusion process is in the range of 165 to 300° C., preferably in the range of 170 to 280° C., more preferably in the range of 170 to 240° C.

The extrusion temperature in the mixing zone of the extruder comprised in the first or only extrusion process is greater than the melting temperature of the olefin polymer. Further, the temperature needs to be greater than the decomposition temperature of the free radical generator. The temperature needs to be less than the decomposition temperature of the olefin polymer. Suitably, the temperature is from about 5° C. greater than the melting temperature of the olefin polymer, preferably from about 10° C. greater than the melting temperature of the olefin polymer to preferably about 260° C., more preferably about 240° C. and especially preferably to about 220° C. For instance, for some olefin polymers, like for example propylene homopolymers the temperature should be preferably at least 165° C., more preferably at least 170° C.

In the process for producing the modified olefin polymer according to the invention, further components such as other polymer and/or additives may be introduced into the extruder(s). Examples of additives include, but are not limited to, stabilizers such as antioxidants (for example sterically hindered phenols, phosphites/phosphonites, sulphur containing antioxidants, alkyl radical scavengers, aromatic amines, hindered amine stabilizers, or blends thereof), metal deactivators (for example Irganox® MD 1024), or UV stabilizers (for example hindered amine light stabilizers). Other typical additives are modifiers such as antistatic or antifogging agents (for example ethoxylated amines and amides or glycerol esters), acid scavengers (for example Ca-stearate), blowing agents, cling agents (for example polyisobutene), lubricants and resins (for example ionomer waxes, polyethylene- and ethylene copolymer waxes, Fischer-Tropsch waxes, montan-based waxes, fluoro-based compounds, or paraffin waxes), nucleating agents (for example talc, benzoates, phosphorous-based compounds, sorbitoles, nonitol-based compounds or amide-based compounds), as well as slip and antiblocking agents (for example erucamide, oleamide, talc, natural silica and synthetic silica or zeolites) and mixtures thereof. Examples of other polymers include, but are not limited to polypropylene and polyethylene homo and copolymers.

In case more than one extruder is used the additives are usually added to the second or subsequent extruder, if present. In case only one extruder is used the additives are added to this extruder.

Generally the total amount of additives introduced into the extruder during the process for producing the modified olefin polymer according to the invention, is not more than 5.0 wt %, preferably not more than 1.0 wt %, more preferably not more than 0.8 wt %. The amount of additives is calculated based on the total amount of the dry olefin polymer.

Generally the total amount of other polymers introduced into the extruder during the process for producing the modified olefin polymer according to the invention, is not more than wt %, preferably not more than 50 wt %, like in the range of 10 to 30 wt %, more preferably not more than 20 wt %, even more preferably not more than 10 wt % and especially preferably not more than 5 wt %. The amount of other polymers is calculated based on the total amount of the dry olefin polymer.

Generally the additives and/or polymers are introduced into the extruder in the mixing zone.

As it was mentioned above where only one extruder is present in the extrusion process, it is preferred to remove gaseous material from the extruder of the first extrusion process via one or more evacuation ports or, as they are sometimes called, vent ports by for example, application of vacuum in a range from 600 to 100 mbar.

The gaseous components may include unreacted functionally unsaturated compound, unreacted free radical generator or decomposition products thereof. Venting of gaseous material from the extruder is well known in the industry and is discussed, for instance, in the above-mentioned book of Chris Rauwendaal, in paragraphs 8.5.2 and 8.5.3.

It is possible to use more than one evacuation port. For instance, there may be two ports, an upstream port for crude degassing and a downstream port for removing the remaining volatile material. Such an arrangement is advantageous if there is large amount of gaseous material in the extruder.

The vent ports are suitably located in the mixing zone. However, they may also be located at the downstream end of the melting zone. Especially if there are multiple vent ports it is sometimes advantageous to have the most upstream port within the melting zone and the subsequent port(s) in the mixing zone.

It is also possible to add a stripping agent, such as water, steam, $CO_2$ or $N_2$, into the extruder. Such stripping agent, when used, is introduced upstream of the vent port or, when there are multiple vent ports, upstream of the most downstream vent port and downstream of the upstream vent port. Typically the stripping agent is introduced into the mixing zone or at the downstream end of the melting zone. Stripping is discussed, among others, in paragraph 8.5.2.4 of the book of Chris Rauwendaal. After the first extrusion process where generally the free radical generator is decomposed and the majority of the modified olefin polymer is generally being formed, the melt of the modified olefin polymer is either transferred to a pelletizer or transferred to a second extrusion process. When the melt of the modified olefin polymer is transferred to the second extrusion process, such melt is extruded through a devolatilization zone in order to remove the decomposition products and/or gaseous material created during the first extrusion process to a level lower than the level achieved in a single extrusion process.

As it was mentioned above, the devolatilization zone generally comprises one or more evacuation, or vent, ports for removing gaseous components from the melt of the modified olefin polymer. The removal of the gaseous components is generally made by for example, application of vacuum at a pressure of <100 mbar. The gaseous components may include unreacted functionally unsaturated compound, unreacted free radical generator or decomposition products thereof.

It is possible to use more than one evacuation port. For instance, there may be two ports, an upstream port for crude degassing and a downstream port for removing the remaining volatile material. Such an arrangement is advantageous if there is large amount of gaseous material in the extruder of the second extrusion process.

It is also possible to add a stripping agent, such as water, steam, carbon dioxide or nitrogen into the extruder of the second extrusion process. Such stripping agent, when used, is introduced upstream of the vent port or, when there are multiple vent ports, upstream of the most downstream vent port and downstream of the upstream vent port. Stripping is discussed, among others, in paragraph 8.5.2.4 of the book of Chris Rauwendaal.

In special cases it is possible to remove gaseous materials also from the first extruder.

At the end of the devolatilization zone the melt generally enters the die zone. After the melt of the modified olefin polymer is pressed through the die, it is typically solidified and cut into pellets in a pelletizer.

The resulting modified olefin polymer generally has an amount of residual decomposition products, as measured according to VDA 277, of less than 200 µg/g, preferably of less than 150 µg/g, more preferably of less than 100 µg/g.

In the following clauses preferred features of the present invention are described.

1. A process for producing a modified olefin polymer in an extruder having a feed zone, a melting zone, a mixing zone and a die zone, the process comprising the steps of: (A) introducing a stream of the olefin polymer into the feed zone of the extruder; (B) introducing a stream of a free radical generator directly into the feed zone, or the melting zone of the extruder; (C) introducing a stream of a functionally unsaturated compound directly into the feed zone or the melting zone of the extruder; (D) extruding the mixture in the extruder at a temperature which is greater than the decomposition temperature of the free radical generator and the melting temperature of the olefin polymer but less than the decomposition temperature of the olefin polymer thereby producing the modified olefin polymer in the extruder; and (E) passing the melt of the modified olefin polymer through the die zone to a pelletiser.

2. The process according to clause 1 wherein at least one of the streams of the free radical generator or the functionally unsaturated compound is introduced into the feed zone of the extruder.

3. The process according to clause 1 wherein at least one of the streams of the free radical generator and the functionally unsaturated compound is introduced into the melting zone of the extruder.

4. The process according to clause 3 wherein the stream of the functionally unsaturated compound is introduced into the melting zone of the extruder.

5. The process according to clause 3 or clause 4 wherein both of the streams of the free radical generator and the functionally unsaturated compound are introduced into melting zone of the extruder.

6. The process according to clause 5 wherein the stream of the functionally unsaturated compound is introduced downstream of the stream of the free radical generator.

7. The process according to any one of the preceding clauses wherein the olefin polymer is selected from the group consisting of homopolymers of propylene; copolymers of propylene with one or more comonomers selected from ethylene and alpha-olefins having from 4 to 10 carbon atoms; and mixtures thereof.

8. The process according to clause 7 wherein the temperature in the melting zone of the extruder is within the range of from 165 to 300° C., preferably from 170 to 280° C. and especially preferably from 170 to 240° C.

9. The process according to any one of the preceding clauses wherein the free radical generator is selected from the group consisting of acyl peroxides, alkyl peroxides, hydroperoxides, peresters, peroxycarbonates and mixtures thereof.
10. The process according to clause 9 wherein the free radical generator is selected from the group consisting of benzoyl peroxide, 4-chlorobenzoyl peroxide, 3-methoxybenzoyl peroxide, methyl benzoyl peroxide,): allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide, 1-hydroxybutyl n-butyl peroxide, butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butylperoxy isopropyl carbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate, t-butyl perpropionate and mixtures thereof
11. The process according to any one of the preceding clauses wherein the functionally unsaturated compound is a bifunctionally unsaturated monomer or polymer.
12. The process according to clause 11 wherein the bifunctionally unsaturated monomer is selected from the group consisting of divinyl compounds, allyl compounds, dienes, aromatic or aliphatic bis (maleimide), aromatic or aliphatic bis (citraconimide) and mixtures thereof.
13. The process according to clause 12 wherein the bifunctionally unsaturated monomer is selected from the group consisting of divinylaniline, m-divinylbenzene, p-divinylbenzene, divinylpentane, divinylpropane, allyl acrylate, allyl methacrylate, allyl methyl maleate, allyl vinyl ether, 1,3 butadiene, chloroprene, cyclohexadiene, cyclopentadiene, 2,3 dimethylbutadiene, heptadiene, hexadiene, isoprene, 1,4 pentadiene and mixtures thereof.
14. The process according to clauses 1 to 10 wherein the functionally unsaturated compound is a multifunctionally unsaturated polymer.
15. The process according to clause 14 wherein multifunctionally unsaturated polymer is selected from the group consisting of polybutadienes, copolymers of butadiene and styrene and mixtures thereof
16. Polypropylene products obtainable by the process of any one of the preceding clauses characterised by a F30 melt strength of at least 3.4 cN, more preferably from 4.0 to 50.0 cN, especially preferably from 10.0 to 40.0 cN, and a v30 melt extensibility of at least 170 mm/s, preferably of at least 200 mm/s and especially preferably from 240 to 300 mm/s.
17. Polyolefin products obtainable by the process of any one of the preceding clauses characterised by a F30 melt strength of at least 3.4 cN, more preferably from 4.0 to 50.0 cN, especially preferably from 10.0 to 40.0 cN, and a v30 melt extensibility of at least 170 mm/s, preferably of at least 200 mm/s and especially preferably from 240 to 300 mm/s.

In the following clauses further preferred features of the present invention are described.
1. A process for producing a modified olefin polymer wherein a first extrusion process is carried out in an extruder having a feed zone, a melting zone, a mixing zone and optionally a die zone, the first extrusion process comprising the steps of: (A) introducing a stream of an olefin polymer into the feed zone of the extruder; (B) introducing a stream of a free radical generator directly into the melting zone or the mixing zone of the extruder; (C) introducing a stream of a functionally unsaturated compound directly into the melting zone or the mixing zone of the extruder; (D) extruding the mixture in the extruder at a temperature which is greater than the decomposition temperature of the free radical generator and the melting temperature of the olefin polymer but less than the decomposition temperature of the olefin polymer thereby producing the modified olefin polymer in the extruder.
2. The process according to clause 1 comprising the steps of: (E) transferring the melt of the modified olefin polymer to a second extrusion process, the second extrusion process being carried out in a extruder having a devolatilization zone and a die zone, wherein such second extrusion process comprises the steps of: (F) extruding the melt of the modified olefin polymer through the devolatilization zone thereby withdrawing volatile components from the polymer melt; and (G) passing the melt of the modified olefin polymer through the die zone to a pelletiser.
3. The process according to clause 2 wherein the residence time of the melt of the modified olefin polymer in the devolatilization zone of the second extrusion process is >15 seconds.
4. The process according to any one of clauses 2 or 3 wherein the resulting modified olefin polymer has an amount of residual decomposition products, as measured according to VDA 277, of less than 100 µg/g.
5. The process according to any one of the preceding clauses comprising the step of introducing at least one of the streams of the free radical generator and the functionally unsaturated compound into the mixing zone of the extruder, in the first extrusion process.
6. The process according to any one of clauses 1 to 4 or 5 comprising the step of introducing at least one of the streams of the free radical generator and the functionally unsaturated compound into the melting zone of the extruder, in the first extrusion process.
7. The process according to clause 6 comprising the step of introducing the stream of the functionally unsaturated compound into the melting zone of the extruder, in the first extrusion process.
8. The process according to clause 7 comprising the step of introducing both of the streams of the free radical generator and the functionally unsaturated compound into the melting zone of the extruder, in the first extrusion process.
9. The process according to clause 8 comprising the step of introducing the stream of the functionally unsaturated compound downstream of the stream of the free radical generator, in the first extrusion process.

10. The process according to any one of the preceding clauses wherein the olefin polymer is selected from the group consisting of homopolymers of propylene; copolymers of propylene with one or more comonomers selected from ethylene and alpha-olefins having from 4 to 10 carbon atoms; and mixtures thereof.
11. The process according to clause 10 wherein the temperature in the melting zone of the extruder, in the first extrusion process, is within the range of from 165 to 300° C., preferably from 170 to 280° C. and especially preferably from 170 to 240° C.
12. The process according to any one of the preceding clauses wherein the free radical generator is selected from the group consisting of acyl peroxides, alkyl peroxides, hydroperoxides, peresters, peroxycarbonates and mixtures thereof.
13. The process according to any one of the preceding clauses wherein the functionally unsaturated compound is a bifunctionally unsaturated monomer or polymer.
14. The process according to clause 12 wherein the bifunctionally unsaturated monomer is selected from the group consisting of divinyl compounds, allyl compounds, dienes, aromatic or aliphatic bis (maleimide), aromatic or aliphatic bis (citraconimide) and mixtures thereof.
15. Polypropylene products obtainable by the process of any one of the preceding clauses characterised by a F30 melt strength of at least 3.4 cN, more preferably from 4.0 to 50.0 cN, especially preferably from 10.0 to 40.0 cN, and a v30 melt extensibility of at least 170 mm/s, preferably of at least 200 mm/s and especially preferably from 240 to 300 mm/s, the resulting modified polypropylene product having an amount of residual decomposition products, as measured according to VDA 277, of less than 100 μg/g.

The present invention will now be described by the following non-limiting examples.

Measuring Methods

The following definitions of terms and determination methods apply for the above general description of the invention as well as to the below examples unless otherwise defined.

Melt Flow Rate

The melt flow rate (MFR) or melt index (MI) is measured according to ISO 1133. Where different loads can be used, the load is normally indicated as the subscript, for instance, $MFR_2$ which indicates 2.16 kg load. The temperature is selected according to ISO 1133 for the specific polymer, for instance, 230° C. for polypropylene and 190° C. for polyethylene. Thus, for polypropylene $MFR_2$ is measured at 230° C. temperature and under 2.16 kg load.

Molecular Weight Averages, Molecular Weight Distribution, Long Chain Branching Index (Mn, Mw, MWD, g') Determined by SEC/VISC-LS Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4 2003. A PL 220 (Polymer Laboratories) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Polymer Laboratories as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 μL of sample solution were injected per analysis. The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0,053 cm³/g.

The molar mass at each elution slice was determined by light scattering using a combination of two angels 15° and 90°. All data processing and calculation was performed using the Cirrus Multi-Offline SEC-Software Version 3.2 (Polymer Laboratories a Varian Inc. Company). The molecular weight was calculated using the option in the Cirrus software "use combination of LS angles" in the field "sample calculation options subfield slice MW data from".

The data processing is described in details in G. Saunders, P. A. G: Cormack, S. Graham; D. C. Sherrington, Macromolecules, 2005, 38, 6418-6422. Therein the $Mw_i$ at each slice is determined by the 90° angle by the following equation:

$$Mw_i = \frac{K_{LS} * R(\theta)^{90°}}{\frac{dn}{dc} * R * P(\theta)}$$

The Rayleigh ratio $R(\theta)^{90°}$ of the 90° angle is measured by the LS detector and R is the response of the RI-detector. The particle scatter function $P(\theta)$ is determined by the usage of both angles (15° and 90°) as described by C. Jackson and H. G. Barth(C. Jackson and H. G. Barth, "Molecular Weight Sensitive Detectors" in: Handbook of Size Exclusion Chromatography and related techniques, C.-S. Wu, $2^{nd}$ ed., Marcel Dekker, New York, 2004, p. 103). For the low and high molecular region in which less signal of the LS detector or RI detector respectively was achieved a linear fit was used to correlate the elution volume to the corresponding molecular weight.

The dn/dc used in the equation is calculated from the detector constant of the RI detector, the concentration c of the sample and the area of the detector response of the analysed sample.

The relative amount of branching is determined using the g'-index of the branched polymer sample. The long chain branching (LCB) index is defined as $g'=[\eta]_{br}/[\eta]_{lin}$. It is well known if the g' value increases the branching content decreases. $[\eta]$ is the intrinsic viscosity at 160° C. in TCB of the polymer sample at a certain molecular weight and is measured by an online viscosity and a concentration detector. The intrinsic viscosities were measured as described in the handbook of the Cirrus Multi-Offline SEC-Software Version 3.2 with use of the Solomon-Gatesman equation.

The necessary concentration of each elution slice is determined by a RI detector. $[\eta]_{lin}$ is the intrinsic viscosity of a linear sample and $[\eta]_{br}$ the viscosity of a branched sample of the same molecular weight and chemical composition. The number average of $g'_n$ and the weight average $g'_w$ are defined as:

$$g'_n = \frac{\sum_{0}^{i} a_i * \frac{[\eta]_{br,i}}{[\eta]_{lin,i}}}{\sum a_i}$$

Where $a_i$ is dW/dlogM of fraction i and $A_i$ is the cumulative dW/dlogM of the polymer up to fraction i. The $[\eta]_{lin}$ of the linear reference (linear isotactic PP) over the molecular weight was measured with an online viscosity detector. Following K and α values were obtained (K=30.68*10$^{-3}$ and α=0.681) from the linear reference in the molecular weight range of log M=4.5-6.1. The $[\eta]_{lin}$ per slice molecular weight for the g' calculations was calculated by following relationship $[\eta]_{lin,i}=K*M_i^{\alpha}$. $[\eta]_{br,i}$ was measured for each particular sample by online viscosity and concentration detector.

gpcBR Index:

The gpcBR index is calculated by using the following formula:

$$gpc_{BR} = \left[\left(\frac{[\eta]_{lin}}{[\eta](\text{bulk})}\right)\right] \cdot \left[\frac{Mw(LS15)}{M_{w,lin}}\right]^{\alpha} - 1$$

Where the Mw (LS15) is calculated from the light scattering elution area of 15° angle and [η] (bulk) from the corresponded viscosity detector elution area by using the Cirrus Multi-Offline SEC-Software Version 3.2 and the following approach.

$$Mw(LS15) = \frac{K_{LS} \cdot Area_{LS15-det}}{\frac{dn}{dc} \cdot Area_{RI-det}}$$

$$[\eta](\text{bulk}) = K_{IV} \cdot \frac{\sum nSp_i}{C} (dl/g)$$

Where $K_{LS}$ is the light scattering constant of 15° angle, dn/dc is the refractive index increment as calculated from the detector constant of the RI detector, $K_{IV}$ is the detector constant of the viscometer, $Sp_i$ is the specific viscosity at each chromatographic slice and C is the corresponded concentration in g/dl.

Initially the molecular weight and intrinsic viscosity for the linear polypropylene standard sample are determined using universal calibration approach applying the corresponded Mark Houwink constants for linear PP ("linear") for both molecular weight and intrinsic viscosity as a function of elution volume using the corresponded equations:

$$[\eta]_{lin} = \Sigma w_i \cdot IV_{lin,i}$$

Gel Content

About 2 g of the polymer ($m_p$) are weighed and put in a mesh of metal and the combined weight of the polymer and the mesh is determined ($m_p+m$). The polymer in the mesh is extracted in a soxhlet apparatus with boiling xylene for 5 hours. The eluent is then replaced by fresh xylene and the boiling is continued for another hour. Subsequently, the mesh is dried and weighed again for obtaining the combined mass of hot xylene insoluble polymer (XHU) and the mesh ($m_{XHU}+m$). The mass of the xylene hot insoluble polymer ($m_{XHU}$) obtained by the formula ($m_{XHU}+m$)−m=$m_{XHU}$ is put in relation to the weight of the polymer ($m_p$) to obtain the fraction of xylene insoluble polymer $m_{XHU}/m_p$. This fraction of xylene insoluble polymer is then taken as the gel content.

$F_{30}$ and $F_{200}$ Melt Strength and $v_{30}$ and $v_{200}$ Melt Extensibility The test described herein follows ISO 16790:2005. An apparatus according to FIG. 1 of ISO 16790:2005 is used.

The strain hardening behaviour is determined by the method as described in the article "Rheotens-Mastercurves and Drawability of Polymer Melts", M. H. Wagner, Polymer Engineering and Science, Vol. 36, pages 925 to 935. The strain hardening behaviour of polymers is analysed by Rheotens apparatus (product of Göttfert, Siemensstr.2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). For measuring F30 melt strength and v30 melt extensibility, the pressure at the extruder exit (=gear pump entry) is set to 30 bars by by-passing a part of the extruded polymer. For measuring F200 melt strength and v200 melt extensibility, the pressure at the extruder exit (=gear pump entry) is set to 200 bars by by-passing a part of the extruded polymer.

The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec2. The Rheotens was operated in combination with the PC program EXTENS. This is a real-time data-acquisition program, which displays and stores the measured data of tensile force and drawdown speed. The end points of the Rheotens curve (force versus pulley rotary speed), where the polymer strand ruptures, are taken as the F30 melt strength and v30 melt extensibilty values, or the F200 melt strength and v200 melt extensibilty values, respectively.

Particle Size and Particle Size Distribution

A gradation test was performed on the polymer samples. The sieve analysis involved a nested column of sieves with wire mesh screen with the following sizes: >20 µm, >32 µm, >63 µm, >100 µm, >125 µm, >160 µm, >200 µm, >250 µm, >315 µm, >400 µm, >500 µm, >710 µm, >1 mm, >1.4 mm, >2 mm, >2.8 mm. The samples were poured into the top sieve which has the largest screen openings. Each lower sieve in the column has smaller openings than the one above (see sizes indicated above). At the base is the receiver. The column was placed in a mechanical shaker. The shaker shook the column. After the shaking was completed the material on each sieve was weighed. The weight of the sample of each sieve was then divided by the total weight to give a percentage retained on each sieve.

EXAMPLES

The following peroxide solutions were used in the examples:

Peroxide solution 1: 75% by weight of free radical generator having a half-life at 160° C. of from 25 to 45 seconds (density about 0.90 g/ml);

Peroxide solution 2: A solution comprising 67% by weight of Peroxide solution 1 and 33% by weight of isododecane;

The following polymers were used in the examples:

Polymer 1: Polypropylene homopolymer in powder form having $MFR_2$ of 0.6 g/10 min and a median particle size of 0.23 mm.

Polymer 2: Polypropylene homopolymer in pellet form having $MFR_2$ of 0.8 g/10 min and a pellet size of about 3.9-3.7 mm.

Polymer 3: Random copolymer of propylene with ethylene in powder form having $MFR_2$ of 0.22 g/10 min and a median particle size of 1.69 mm.

Polymer 4: Polypropylene homopolymer in powder form having $MFR_2$ of 0.8 g/10 min and a median particle size of 1.55 mm.

Polymer 5: Polypropylene homopolymer in powder form having $MFR_2$ of 2.0 g/10 min and a median particle size of about 0.55 mm.

An additive package containing 17% of Ca-stearate, 17% of synthetic hydrotalcite and the reminder of Irganox B225 was mixed with the polymer which was introduced to the feed port in all examples.

Example 1

A ZSK 30 co-rotating twin screw extruder having L/D of 38 was used for reactive extrusion as follows. Powder was fed at a distance of L/D 1.5 from the upstream end of the screw. Peroxide and/or butadiene feed points were at L/D of 8 and 12 from the upstream end of the screw. Additive feed was at L/D of 24 and vacuum port was at L/D of 33. In the range of L/D from 9 to 24 the screw contained mixing elements whereas from 1 to 9 and 24 to 38 conveying elements. The barrel temperatures were about 110° C. in the upstream end of the melting zone, from 180° C. to 200° C. in the mixing zone and about 220° C. at the die. The vacuum was set to −0.25 bar g.

Polymer 1 was introduced into the feed port of the extruder. Into the liquid feed port at L/D of 8 were introduced 1,3-butadiene and Peroxide solution 1 as described above so that the feed rates of the peroxide solution and butadiene were 0.72% by weight and 0.23% by weight of the combined feed of the propylene homopolymer, butadiene and peroxide solution, respectively. The polymer feed rate was 8 kg/h. The resulting polymer had $MFR_2$ of 2.0 g/10 min, $F_{30}$ of 35 cN, $v_{30}$ of 249 mm/s and the fraction of hot xylene unsoluble material of 0.42%. The data indicate that the polymer contained long-chain branches (high values of $F_{30}$ and $v_{30}$) but the amount of cross-linked material was low (low value of XHU). The data is summarised in Table 1

Example 2

The procedure of Example 1 was repeated except that Polymer 5 was used as the polymer raw material. The feed rates of Peroxide solution 1 and 1,3-butadiene were as shown in Table 1.

Example 3

The procedure of Example 1 was repeated except that Polymer 2 was used as the polymer raw material and the butadiene was introduced to the feed port at L/D of 12. The feed rates of Peroxide solution 1 and 1,3-butadiene were as shown in Table 1.

Example 4

The procedure of Example 1 was repeated except that Peroxide solution 2 was used instead of Peroxide solution 1. The feed rates of Peroxide solution 2 and 1,3-butadiene were as shown in Table 1.

TABLE 1

| Example | PP | POX | Pox amount, Wt % | BD amount, Wt % | $MFR_2$, g/10 min | $F_{30}$, cN | $V_{30}$, mm/s | XHU Wt % | $SHI_{3/100}$ |
|---|---|---|---|---|---|---|---|---|---|
| 1 | 1 | 1 | 0.72 | 0.23 | 2.0 | 35 | 249 | 0.42 | 58 |
| 2 | 5 | 1 | 0.59 | 0.51 | 2.3 | 28 | 244 | 0.43 | 58 |
| 3 | 2 | 1 | 0.46 | 0.4  | 1.6 | 29 | 250 | 1.2  | 37 |
| 4 | 1 | 2 | 0.99 | 0.21 | 1.5 | 30 | 256 | 0.09 | 46 |
| 5 | 3 | 1 | 0.75 | 0.15 | 1.7 | 34 | 246 | 0.37 | 61 |
| 6 | 1 | 1 | 0.59 | 0.2  | 3.3 | 27 | 260 | <0.05 | 38 |

Example 5

The procedure of Example 1 was repeated except that Polymer 3 was used as the polymer raw material. The feed rates of Peroxide solution 1 and 1,3-butadiene were as shown in Table 1.

Example 6

The procedure of Example 1 was repeated except that the feed rates of the peroxide solution and 1,3-butadiene were as shown in Table 1.

Example 7

The extruder described in Example 1 was operated as described in Example 1 with the following exceptions.

Polymer 4 was introduced into the feed port of the extruder together with Peroxide solution 1. 1,3-butadiene was introduced into the liquid feed port at L/D of 8. The feed rates of the peroxide solution and butadiene were 0.74% by weight and 0.22% by weight of the combined feed of the propylene homopolymer, butadiene and peroxide solution, respectively. The polymer feed rate was 8 kg/h.

The resulting polymer had $MFR_2$ of 1.6 g/10 min, $F_{30}$ of 32 cN, $v_{30}$ of 239 mm/s and the fraction of hot xylene unsoluble material of 0.74%. The data indicate that the polymer contained long-chain branches (high values of $F_{30}$ and $v_{30}$) but the amount of cross-linked material was low (low value of XHU). The data is summarised in Table 2.

Example 8

The procedure of Example 7 was repeated except that the 1,3-butadiene was introduced into the liquid feed port at L/D of 12. The feed rates of Peroxide solution 1 and 1,3-butadiene were as shown in Table 2. Further, Polymer 2 was used as the polymer raw material.

Reference Example 1

The process of Example 1 of U.S. Pat. No. 6,077,907 was repeated by using Polymer 1 as the polymer raw material. The amounts of peroxide and 1,3-butadiene were 0.09% by weight and 0.28% by weigh, respectively. The data is shown in Table 2.

TABLE 2

| Example | PP | POX | Pox amount, Wt % | BD amount, Wt % | $MFR_2$, g/10 min | $F_{30}$, cN | $v_{30}$, mm/s | XHU Wt % | $SHI_{3/100}$ |
|---|---|---|---|---|---|---|---|---|---|
| 7 | 4 | 1 | 0.74 | 0.22 | 1.6 | 32 | 239 | 0.74 | 60 |
| 8 | 2 | 1 | 0.66 | 0.57 | 2.5 | 29 | 255 | 1.2 | 39 |
| R1 | 1 |   | 0.09 | 0.28 | 2.1 | 35 | 250 | 0.5 |   |

The invention claimed is:

1. A process for producing a modified olefin polymer in an extruder having a feed zone, a melting zone, optionally a mixing zone and optionally a die zone,
   (A) introducing a stream of an olefin polymer which is a homopolymer of propylene or a copolymer of propylene having a melt flow rate, measured according to ISO 1133 under a load of 2.16 kg and at a temperature of 230° C., of 0.1 to 50 g/10 min into the feed zone of the extruder;
   (B) introducing a stream of a free radical generator directly into the feed zone or the melting zone or the mixing zone, if present, of the extruder;
   (C) introducing a stream of a functionally unsaturated compound chosen from
      (i) a bifunctionally unsaturated monomer selected from the group consisting of divinyl compounds, allyl compounds, dienes, aromatic or aliphatic bis (maleimide), aromatic or aliphatic bis (citraconimide) and mixtures thereof or polymer; or
      (ii) a bifunctionally or multifunctionally unsaturated polymer directly into the feed zone or the melting zone or the mixing zone, if present, of the extruder;
   (D) extruding the mixture in the extruder at a temperature which is greater than the decomposition temperature of the free radical generator and the melting temperature of the olefin polymer but less than the decomposition temperature of the olefin polymer thereby producing the modified olefin polymer in the extruder;
   and, optionally,
   (G) passing the melt of the modified olefin polymer through the die zone to a pelletiser whereby the modified olefin polymer has
      a $F_{30}$ melt strength of at least 3.4 cN and
      a melt extensibility of at least 170 mm/s.

2. The process according to claim 1 wherein at least one of the streams of the free radical generator or the functionally unsaturated compound is introduced directly into the feed zone of the extruder.

3. The process according to claim 1 wherein at least one of the streams of the free radical generator and the functionally unsaturated compound is introduced directly into the melting zone or the mixing zone, if present, of the extruder.

4. The process according to claim 3 wherein the stream of the functionally unsaturated compound is introduced directly into the melting zone or the mixing zone, if present, of the extruder.

5. The process according to claim 1 wherein both of the streams of the free radical generator and the functionally unsaturated compound are introduced directly into melting zone or the mixing zone, if present, of the extruder.

6. The process according to claim 5 wherein the stream of the functionally unsaturated compound is introduced downstream of the stream of the free radical generator.

7. The process according to claim 1 wherein the homopolymer of propylene or copolymer of propylene is selected from the group consisting of homopolymers of propylene; copolymers of propylene with one or more comonomers selected from ethylene and alpha-olefins having from 4 to 10 carbon atoms; and mixtures thereof.

8. The process according to claim 7 wherein the temperature in the melting zone of the extruder is within the range of from 165 to 300° C.

9. The process according to claim 1 wherein the free radical generator is selected from the group consisting of acyl peroxides, alkyl peroxides, hydroperoxides, peresters, peroxycarbonates and mixtures thereof.

10. The process according to claim 9 wherein the free radical generator is selected from the group consisting of benzoyl peroxide, 4-chlorobenzoyl peroxide, 3-methoxybenzoyl peroxide, methyl benzoyl peroxide,): allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide, 1-hydroxybutyl n-butyl peroxide, butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butylperoxy isopropyl carbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate, t-butyl perpropionate and mixtures thereof.

11. The process according to claim 1 wherein the bifunctionally unsaturated monomer is selected from the group consisting of divinylaniline, m-divinylbenzene, p-divinylbenzene, divinylpentane, divinylpropane, allyl acrylate, allyl methacrylate, allyl methyl maleate, allyl vinyl ether, 1,3 butadiene, chloroprene, cyclohexadiene, cyclopentadiene, 2,3 dimethylbutadiene, heptadiene, hexadiene, isoprene, 1,4 pentadiene and mixtures thereof.

12. The process according to claim 1 wherein the multifunctionally unsaturated polymer is selected from the group consisting of polybutadienes, copolymers of butadiene and styrene and mixtures thereof.

13. The process according to claim 1 further comprising the step of (E) withdrawing volatile components from the melt of the modified olefin polymer.

14. The process according to claim 13 comprising the step of (G) passing the melt of the modified olefin polymer to a downstream extruder; and wherein the step of withdrawing volatile components from the melt of the modified olefin polymer is conducted in the downstream extruder.

15. The process according to claim 14 further comprising the step of passing the melt of the modified olefin polymer from the downstream extruder through the die zone to the pelletiser.

16. The process according to claim 7 wherein the temperature in the melting zone of the extruder is within the range of from 170 to 280 ° C.

17. The process according to claim 7 wherein the temperature in the melting zone of the extruder is within the range of from 170 to 240 ° C.

* * * * *